June 19, 1962 R. B. IMMEL ET AL 3,040,146
PERMANENT MAGNET ACTUATOR FOR ELECTRIC DEVICES
Filed May 2, 1960 2 Sheets-Sheet 1

WITNESSES
*Robert C. Baird*
*James N. Young*

INVENTORS
Ralph B. Immel &
Bruce C. Wells.
BY
*Paul E. Friedemann*
ATTORNEY

June 19, 1962   R. B. IMMEL ET AL   3,040,146
PERMANENT MAGNET ACTUATOR FOR ELECTRIC DEVICES
Filed May 2, 1960   2 Sheets-Sheet 2
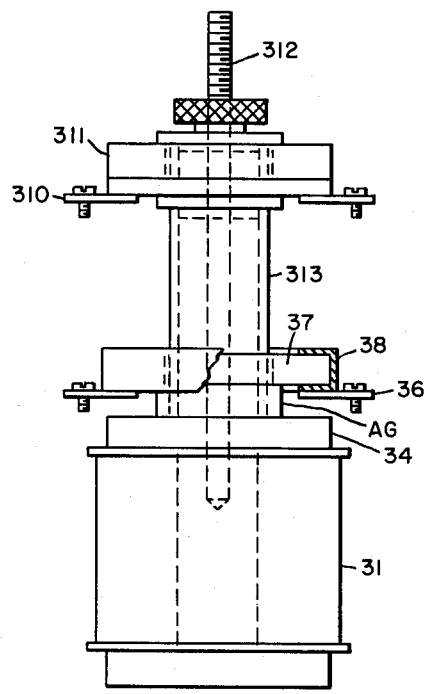
Fig. 3.
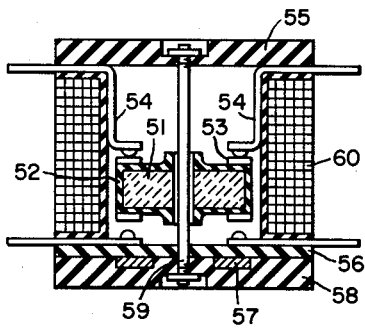
Fig. 5.
Fig. 4.
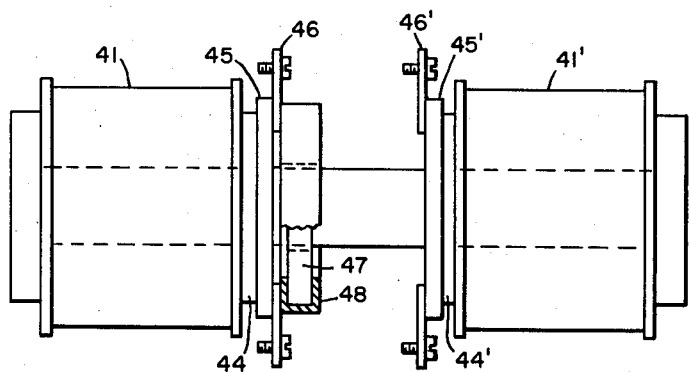

United States Patent Office 3,040,146
Patented June 19, 1962

3,040,146
PERMANENT MAGNET ACTUATOR FOR ELECTRIC DEVICES
Ralph B. Immel, Williamsville, and Bruce C. Wells, Buffalo, N.Y., assignors to Westinghouse Electric Corporation, East Pittsburgh, Pa., a corporation of Pennsylvania
Filed May 2, 1960, Ser. No. 26,326
7 Claims. (Cl. 200—98)

This invention relates to electro-magnetic contactors and more particularly to such contactors having, for the actuation force of the movable member, a permanent magnet field interacting with an electro-magnet field.

Moving coil instruments, relays, and contactors have been known in the trade for many years. As actuators for relays these devices are rather fragile, require precision bearings, or suspension means, and worst of all provide relatively low forces for effecting the movement of the movable part. The use of the ceramic permanent magnet as a movable member has made it possible to create an entirely new type of actuator, or moving member.

The ceramic permanent magnet herein had in mind is of the barium ferrite type. This type of magnet is characterized by the fact that it can be very strongly magnetized and once magnetized is practically in normal use non-demagnetizable. This type of permanent magnet is not only an excellent and low cost magnetic field source and constant reference, but is also a very good insulator.

One broad object of this invention is the use in an electrical device of ceramic permanent magnet as an actuator whose permanent magnetic field coacts with the controllable field of an electromagnet.

It is also a broad object of this invention to provide an extremely simple and friction-free insulated moving member actuator for electric devices.

It is also an object of this invention to provide an arc blow-out field in an electric contactor without the use of any blow-out coil or additional members.

It is a general object of this invention to utilize an energy source for generating a permanent magnetic field for interaction with a controllable electro-magnetic field to obtain a substantial force to thus, where necessary, obtain a substantial movement of a movable element in an industrial contactor, or other electrical device.

The objects recited are merely illustrative. Other objects and advantages will become more apparent from a study of the following specifications and the accompanying drawings, in which:

FIG. 3 shows the application of the principle to an over current relay;

FIG. 4 shows an application of this invention to a latched-in, or polarized relay; and FIG. 5 shows how the principle of this invention can be applied to an extremely desirable form of relay.

Figure 1:
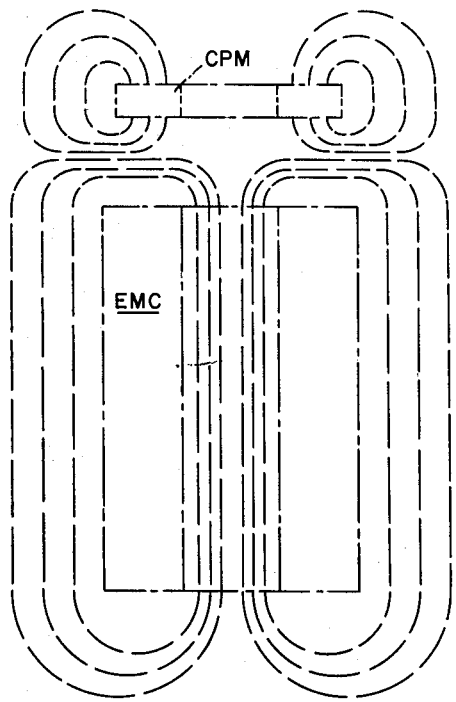
FIGURE 1 is a schematic showing of the basic and well known principle of the interaction of magnetic fields.

In FIG. 1 the electromagnetic coil is designated by EMC. In the showing this coil produces a south pole at its upper end. The ceramic permanent magnet of insulating material is designated CPM. This magnet may be a toroid, as shown, or may be a disc. The magnet is magnetized so that a south pole is in one flat face and a north pole in the other flat face. As shown, the south pole is directed downwardly whereby the permanent magnet, for the energization of the coil above mentioned, is repelled and, if not allowed to move sidewise, will float, or be held in suspension, above the coil at a point where the upwardly directed magnetic force and weight of the magnet are equal. By turning the magnet over or reversing the energization of the coil the magnetic force would be an attracting force.

Figure 2:
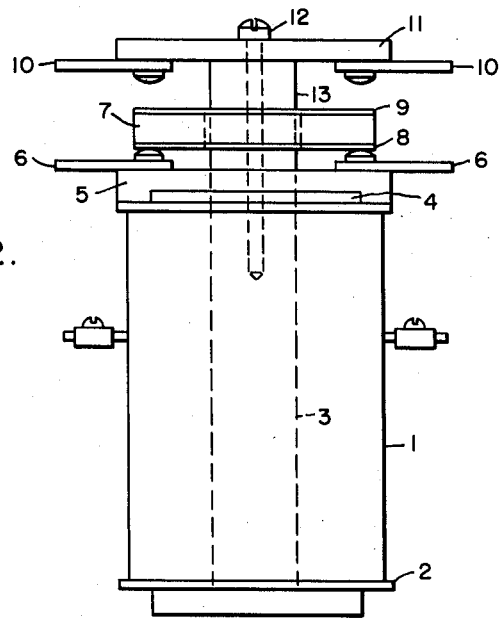
FIG. 2 shows a full-size sketch of an actual single pole-double throw contact assembly in a relay.

In FIG. 2 a full size relay is shown. This relay is of the single pole-double throw type. The electromagnet is shown by coil 1 disposed on the spool 2 of insulating material. The coil has an iron core 3 and a steel pole face 4 in the shape of a disc. A disc of insulating material 5 is secured to the spool 2 and carries the stationary contacts 6 rigidly secured to the disc 5. A ceramic permanent magnet 7 having the metalized faces 8 and 9, when the coil is not energized, rests on the stationary contacts 6. The contact pressure is maintained by the weight of the magnet and by the rather substantial attracting force between the magnet and the pole face 4.

When the coil 1 is energized with a polarity to repel magnet 7 then the magnet 7 moves upwardly so that the metalized surface 9 bridges the contacts 10. The contacts 10 are mounted on the disc of insulating material 11, and the parts are held together by the bolt 12. A nylon sleeve 13 to guide the magnet is interposed between the insulating discs 5 and 11.

The metalized region on the magnet is merely in the form of a ring. The center portion may, if necessary, be provided with vitreous enamel or other glaze to provide more insulation or resistance to direct arcing.

The magnet thus provides a contact bridging element, an arc blow-out field, and no biasing springs of any sort are needed.

In FIG. 3 the principle is applied to an over-current relay. In this assembly the electromagnetic trip point can be adjusted by changing the thickness of the shim or air-gap AG. In this arrangement the actuating coil 31 is heavy copper strap, the pole face 34 is chosen to be rather heavy so that the magnet 37 is firmly actuated against the fixed contacts 36 and is only caused to be actuated—repelled—upwardly upon occurrence of a heavy overload.

When such overload takes place the magnet 37 is propelled upwardly on the nylon guide sleeve 313 to make contact, with its current carrying element 38, with the fixed contacts 310. The magnet is held in position by the steel pole face 311 or, more preferably, by another permanent magnet. The assembly is held together by elements 312.

The bridging contacts 38 when engaging the contacts 310 may energize a light, or alarm, or other device, to indicate an overload has occurred and that the relay needs resetting.

In FIG. 4 a latched-in relay is shown having the permanent magnet 47 as the moving armature and contact bridging member by reason of the current conducting element 48 on the magnet. In this case two coils 41 and 41' are used. The coils have the rolled steel poles 44 and 44'. The stationary contacts are 46 and 46' which are mounted respectively on the insulators 45 and 45'.

The magnet is held in either position by the poles 44 and 44'. The coils are so energized as to repel the magnets. This means when the left-hand coil is energized the magnet is driven to the right and remains there until the right-hand coil is energized.

In FIG. 5 the permanent magnet is designated 51 and 52 designates the insulator for the magnet, 53 the movable contacts on the magnet, 54 the stationary contacts, 55 the cap of insulating material, 56 an insulating plate, 57 a steel ring, 58 an insulator base, 59 the interconnecting support and 60 the operating coil.

Energization of the coil 60 causes the magnet to seek the center of the coil. This is the position shown in FIG. 5. When the coil 60 is deenergized, the supporting flux for the magnet disappears and the magnet moves downward due to its weight and by the attraction between the magnet and the steel ring 57.

While the invention has been illustrated by several embodiments, still other embodiments falling within the spirit of this invention are included.

The claims are:

1. In an electromagnetic device, in combination, a solenoid, a pole piece of larger diameter than the internal diameter of the solenoid secured to one end of the solenoid, a layer of non-magnetic insulating material covering the pole piece, and a flat disc-like permanent magnet of ceramic insulating material disposed on the layer of insulating material, said magnet having a north pole in one flat face and a south pole in the other flat face, whereby the magnetic attraction between the pole piece and magnet holds the magnet firmly against the layer of insulating material but energization of the solenoid with a proper polarity repels the magnet and thus propels it away from the solenoid.

2. In an electromagnetic device, in combination, a solenoid having an iron core, a pole piece of larger diameter than the internal diameter of the solenoid secured to one end of the solenoid, a layer of non-magnetic insulating material covering the pole piece, and a flat disc-like permanent magnet of ceramic insulating material disposed on the layer of insulating material, said magnet having a north pole in one flat face and a south pole in the other flat face, whereby the magnetic attraction between the pole piece and magnet holds the magnet firmly against the layer of insulating material but energization of the solenoid with a proper polarity repels the magnet and thus propels it away from the solenoid.

3. In an electromagnetically actuated switching device, in combination, a solenoid having an iron core and having an iron pole piece at the end of the core of larger diameter than the core, a layer of non-magnetic insulating material disposed over the pole piece, a pair of spaced stationary contacts mounted on the insulating material, a flat permanent magnet of ceramic insulating material magnetically held against the contacts, said magnet having electro-conductive material connected thereto to form a contact bridging member for the stationary contacts, said magnet having a north pole in one flat surface and a south pole in the other flat surface, whereby the magnetic attraction between the pole piece and magnet firmly holds the contact bridging member against the stationary contacts but upon energization of the solenoid with a proper polarity propels the magnet away from the stationary contacts to open the switch.

4. In an electromagnetically actuated switching device, in combination, a solenoid having an iron core and having an iron pole piece at the end of the core of larger diameter than the core, a layer of non-magnetic insulating material disposed over the pole piece, a pair of spaced stationary contacts mounted on the insulating material, a flat permanent magnet of ceramic insulating material magnetically held against the contacts, said magnet having electro-conductive material connected thereto to form a contact bridging member for the stationary contacts, said magnet having a north pole in one flat surface and a south pole in the other flat surface, whereby the magnetic attraction between the pole piece and magnet firmly holds the contact bridging member against the stationary contacts but upon energization of the solenoid with a proper polarity propels the magnet away from the stationary contacts to open the switch, guide means for the magnet when propelled away from the solenoid, a second pair of spaced stationary contacts secured through an insulating member to the guide means, whereby the repelling force between the magnet and the energized solenoid holds the conducting material on the magnet against the second pair of spaced contacts to effect closing of a switch.

5. In an electromagnetically actuated switching device, in combination, a solenoid having an iron core and having an iron pole piece at the end of the core of larger diameter than the core, a flat member of insulating material mounted on the solenoid over the pole piece, a pair of spaced contacts mounted on the member of insulating material, a flat permanent magnet of ceramic insulating material having conductive material mounted thereon to form contact bridging means for the stationary contacts, guide means for the magnet so that it may move toward and away from the solenoid, said magnet having a north pole in one flat surface and a south pole in its other flat surface, whereby the magnetic attraction between the magnet and the pole piece firmly holds the magnet and thus the contact bridging means against the stationary contacts, a second insulating member mounted on the guide means in spaced relation to the first insulating member, a second pair of stationary contacts mounted on the second insulating member in facing relation to the first pair of stationary contacts, a second similar solenoid having an iron core and iron pole piece secured to the second insulating member on the side remote from the second pair of stationary contacts, whereby energization of one solenoid drives the magnet toward the other pair of stationary contacts and energization of the other solenoid drives the magnet toward the first pair of stationary contracts.

6. In an electromagnetically operable switch, in combination, a solenoid having an iron core and having an iron pole piece at its end, the diameter of the pole piece being greater than the diameter of the core, a flat member of insulating material mounted on the solenoid over the pole piece, a pair of spaced contacts mounted on the insulating material with the contacts on the side remote from the pole piece, a flat permanent magnet of ceramic insulating material having conductive material mounted thereon to form a contact bridging member for the stationary contacts, guide means for the magnet so that it may move toward and away from the solenoid, said insulating material being adjustable to any thickness, said magnet having a north pole in one flat face and a south pole in the other flat face, whereby the magnetic attraction between the magnet and the pole piece firmly holds the magnet and thus the contact bridging means against the stationary contacts, a second insulating member mounted on the guide means in spaced relation to the first insulating members, a second pair of stationary contacts mounted in facing relation to the first pair on the second insulating member, a second permanent magnet of ceramic insulating material secured to the second insulating member on the side remote from the side carrying the second pair of stationary contacts.

7. In an electromagnetically operable contactor, in combination, a solenoid, a guide core disposed axially of the solenoid having an end terminating near one end of the solenoid, an iron pole piece near the said one end of the guide core, a contact carrying armature for the solenoid, stationary contacts disposed in cooperative relation to said armature, said armature comprising a flat annulus of permanent magnet of ceramic insulating material disposed on the guide core with the contact carrying material being a ring disposed circumferentially of the armature at the outer peripheral edges of the armature, said iron pole piece being thus disposed to hold the armature in one position at the end of the solenoid when the solenoid is not energized, but which armature takes another position when the solenoid is so energized as to repel the armature.

References Cited in the file of this patent

UNITED STATES PATENTS

| | | |
|---|---|---|
| 649,102 | Flechtenmacher | May 8, 1900 |
| 1,171,021 | Canton | Feb. 8, 1916 |
| 1,573,155 | Gerdien | Feb. 16, 1926 |
| 2,322,069 | Stimson | June 15, 1943 |
| 2,919,323 | Drescher | Dec. 29, 1959 |
| 2,919,324 | Schuessler | Dec. 29, 1959 |
| 2,922,859 | Howell | Jan. 27, 1960 |